(12) United States Patent  
Lamb

(10) Patent No.: US 6,242,832 B1  
(45) Date of Patent: Jun. 5, 2001

(54) SELF UNLOADING MAGNETIC COUPLER

(75) Inventor: Karl J. Lamb, Sequim, WA (US)

(73) Assignee: Magna Force, Inc., Port Angeles, WA (US)

( * ) Notice: Subject to any disclaimer, the term of this patent is extended or adjusted under 35 U.S.C. 154(b) by 0 days.

(21) Appl. No.: 09/420,204

(22) Filed: Oct. 18, 1999

(51) Int. Cl.[7] .......................... H02K 16/00; H02K 49/00
(52) U.S. Cl. ............................ 310/114; 310/103
(58) Field of Search .................. 310/114, 116, 310/117, 266, 92, 103, 105; 192/84.5, 18 B

(56) References Cited

U.S. PATENT DOCUMENTS

| | | | |
|---|---|---|---|
| 5,668,424 | * 9/1997 | Lamb | 310/103 |
| 5,834,872 | * 11/1998 | Lamb | 310/103 |
| 6,005,317 | * 12/1999 | Lamb | 310/103 |
| 6,043,578 | * 3/2000 | Lamb | 310/92 |

* cited by examiner

Primary Examiner—Nestor Ramirez
Assistant Examiner—Dang Dinh Le
(74) Attorney, Agent, or Firm—Seed IP Law Group PLLC

(57) ABSTRACT

A permanent magnet coupler has a conductor rotor assembly mounted on one shaft and a magnet rotor assembly mounted on a coaxial shaft. The magnet rotor assembly provides two magnet rotors spaced by the adjustable air gaps from two conductor elements provided by the conductor rotor assembly. The air gap adjustment includes adjustable stops, such, for example, as swing arms having an adjustable effective length. These stops operate in conjunction with swing arms causing the magnet rotors to move axially in unison in opposite directions. The air gaps are set so that the coupler will automatically release when subjected to an overloaded condition.

13 Claims, 4 Drawing Sheets

SELF UNLOADING MAGNETIC COUPLER

TECHNICAL FIELD

The present invention relates to permanent magnet couplers of the type having a magnet rotor assembly on one shaft having poles spaced by air gaps from two ferrous-backed electroconductive elements provided by a conductor rotor assembly mounted on another shaft. More particularly, the invention relates to a magnetic coupler which will automatically release (pop off) from an overloaded condition.

BACKGROUND OF THE INVENTION

In my prior U.S. Pat. No. 5,477,094 there is shown a magnetic coupler in which a magnet rotor unit is straddled by two conductor rotors which are connected together to rotate as a conductor rotor unit on one shaft while the magnet rotor unit is mounted to rotate on a second shaft. The magnet rotor unit has a set of permanent magnets arranged with their opposite poles spaced by air gaps from ferrous-backed electroconductive rings mounted on respective of the conductor rotors. Rotation of one of the two shafts results in rotation of the other shaft by magnetic action without there being any direct mechanical connection between the shafts.

Such magnetic couplers disclosed in my U.S. Pat. No. 5,477,094, have the advantage that if the load freezes up, for example, the input shaft from the prime mover remains free to rotate, and hence the prime mover is not damaged by the difficulty with the load. However, if this condition is permitted to continue indefinitely the resulting abnormally high slip between the conductor and magnet rotors may result in a heat problem likely to damage the rotors. One solution is to provide a speed sensing system operative to shut down the prime mover when the output shaft stops or when the relative speed between the input and output shaft exceeds a preset amount. However, such a speed sensing system does not provide ideal relief in situations wherein the magnetic coupler is overloaded because of a temporary excess load condition, and not by a freeze-up of the load.

My prior U.S. Pat. No. 5,477,094 also discloses the concept of having two magnet rotors rather than a single magnet rotor unit, with each magnet rotor having a respective set of permanent magnets spaced by an air gap from one of the electroconductive elements presented by the conductor rotors. The two magnet rotors float on the related shaft in that they are axially moveable relative to one another and are spring biased apart. It is now recognized by me that if such a coupler were to be overloaded, the two magnet rotors might move toward one another responsive to the resulting build-up in the slip between the magnet rotors and the conductor rotors to an extent where the current induced in the electroconductive elements results in a repulsion between the magnet rotors and conductor rotors which exceeds the attraction between the magnets on the magnet rotor and the ferrous backing of the electroconductive elements on the conductor rotors. The resulting increase in one or both of the air gaps could temporarily relieve the coupler from the overload condition. The two magnet rotors would then tend to move back toward the conductor rotors if the effect of the increased air gaps in reducing the repulsion between the magnet and conductor rotors is sufficient to permit the magnet attraction to the ferrous backing to dominate. This action could reset the coupler provided that in the meantime the load was sufficiently reduced.

SUMMARY OF THE INVENTION

Although my described previous coupler with two floating magnet rotors shown in my prior U.S. Pat. No. 5,477,094 appears to be theoretically capable of relieving an overloading condition by responsively moving toward one another and thereby increasing one or both of the air gaps, there is no provision for controlling the axial travel of the magnet rotors such as to positively maintain equal air gaps. This deficiency is overcome in accordance with the present invention by utilizing part of the adjusting mechanism disclosed in my prior U.S. Pat. No. 5,834,872 and in my copending allowed application Ser. No. 09/028,872, filed Feb. 20, 1998, in which axial motion of one of two magnet rotors is caused to be duplicated in the opposite axial direction by the other magnet rotor. These magnet rotors are preferably slide mounted on pins projecting from a central rotor mounted on the output shaft. Swing arm units are swing-mounted centrally on the central rotor member and slide-mounted relative to the magnet rotors at the ends of the swing arms so that the magnet rotors move equally in opposite axial directions whenever one of the magnet rotors is moved axially. In accordance with the present invention, adjustable stops are provided to set the minimum for the air gaps. For example, the effective length of some of the swing arms is made adjustable such that when they are fully extended the air gaps are set at the desired minimum width. These adjustable swing arms are slidably interconnected at one end with one of the magnet rotors and have an adjustment screw at the other end which extends into a slot in the swing arm and engages a central pivot assembly projecting from the central rotor into the slot. Advancement of the adjusting screw increases the air gaps between the magnet rotors and the conductor rotors.

DETAILED DESCRIPTION OF THE INVENTION

Figure 1:
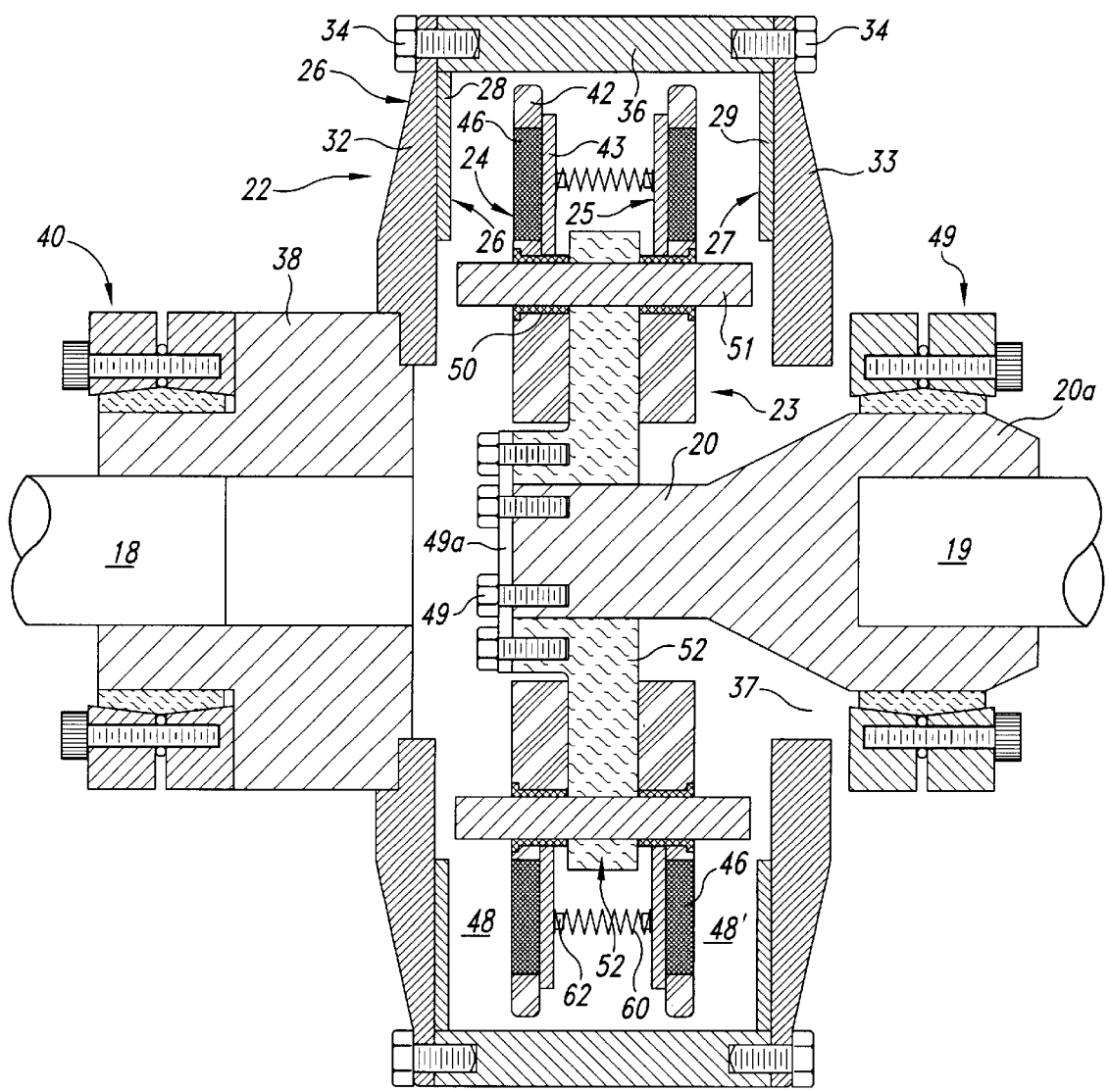
FIG. 1 is a longitudinal sectional view of the invention shown in a wide air gap position and taken as indicated by line 1—1 in FIG. 5.

Referring to the drawings, coaxial input and output shafts 18–19 have mounted thereon a conductor rotor unit 22 and a magnet rotor assembly 23 including a pair of magnet rotors 24–25 and a stub shaft 20. The conductor rotor unit 22 has two axially spaced conductor rotors 26–27 having respective conductor rings 28–29 facing toward one another and formed from a non-ferrous material with high electrical conductivity such as copper. These conductor rings 28–29 are mounted as by screws on respective backing members 32–33 of a magnet attracted material such as mild steel. The backing members 32–33 are connected together by bolts 34 passing through the backing members into threaded holes in the ends of spacers 36. Conductor rotor 27 is separated from the stub shaft 26 by an annular clearance space 37 and backing ring 32 has a hub 38 sleeved on input shaft 18 and secured thereto as by a wedge-type coupling 40 or a key connection.

Each of the magnet rotors 24–25 has a non-ferrous mounting disc 42 backed by a ferrous backing disc 43, preferably of mild steel. The mounting discs 42 may be aluminum or a suitable non-magnetic composite, and each is formed with a set of equally spaced rectangular cutouts 44 arranged in a circle and receiving a respective set of permanent magnets 46 seated against the respective backing disc 43. Adjacent magnets have their polarities reversed. The magnets 46 are spaced by air gaps 48–48' from the conductor rings 28–29 of the conductor rotor unit 22.

The magnet rotors 24–25 are mounted so as to rotate in unison with the output shaft 19 and also be axially moveable relative to one another in opposite axial directions for adjustment of the air gaps 48–48' by an air gap equalizing mechanism. To best utilize this mechanism, the magnet rotors 24–25 are preferably slide-mounted by bushings 50 on opposite axial end portions of combination support and guide pins 51. These pins project in opposite axial directions from a fifth rotor 52 which is mounted on the stub shaft 26 midway between the conductor rings 28–29 as by bolts 49 and a connector plate 49a or by a key connection. The stub shaft 20 tapers outwardly through the opening 37 to a hollow hub portion 20a which is sleeved on the output shaft 19 and secured thereto as by a wedge-type coupling 49 or a key connection.

Figure 2:
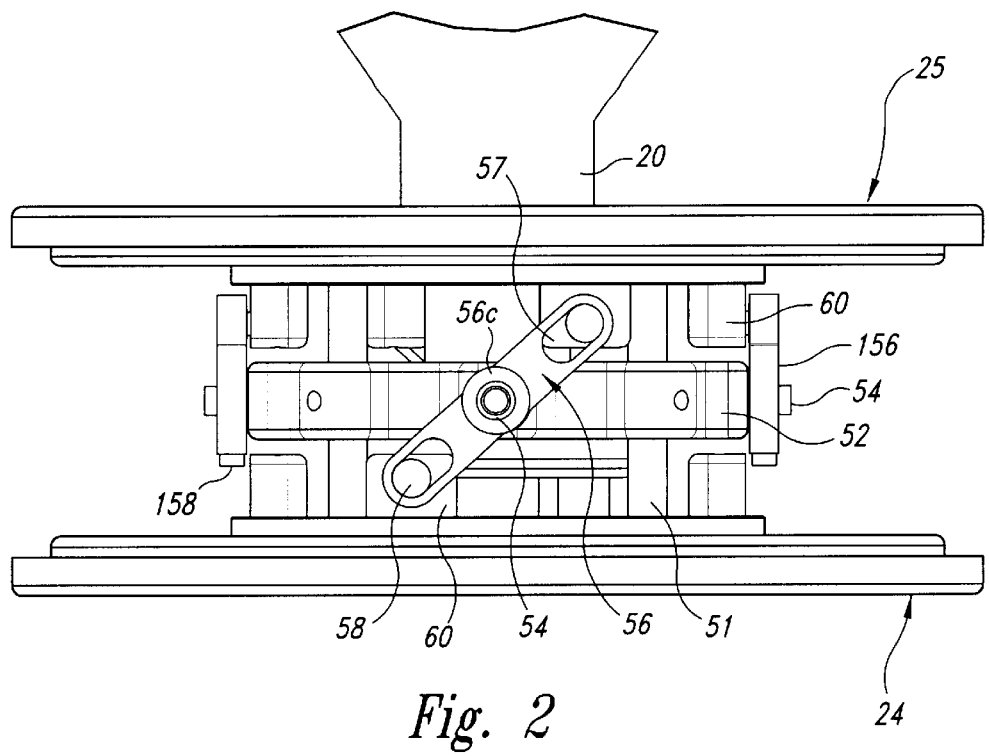
FIG. 2 is a plan view without the conductor rotors and showing the air gap equalizing and adjusting mechanism extended so that the magnet rotors are in a narrow air gap position.
Figure 3:
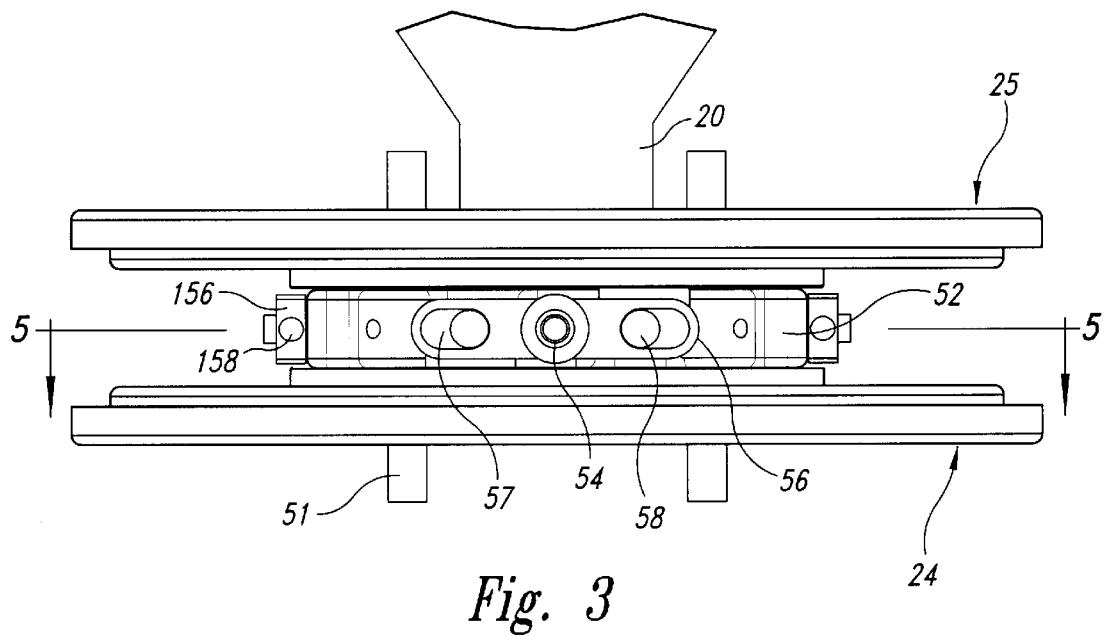
FIG. 3 is a plan view like FIG. 2, but with the air gap equalizing and adjusting mechanism retracted so that the magnet rotors are in a wide air gap position.
Figure 5:
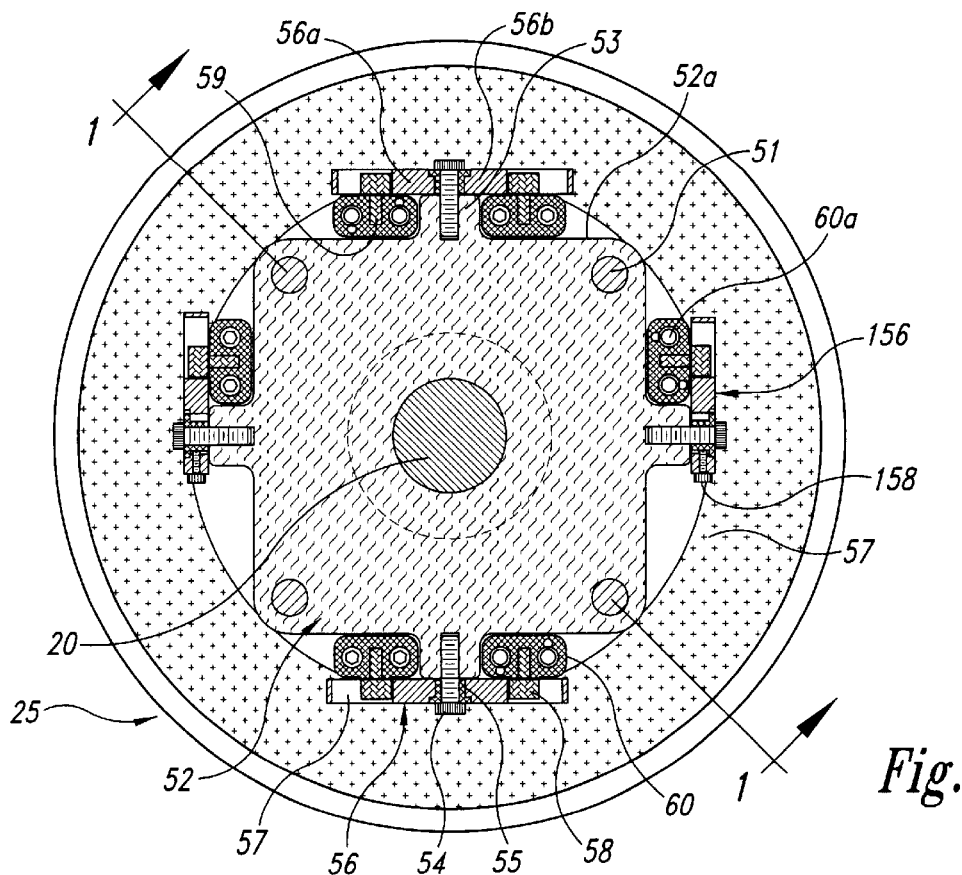
FIG. 5 is a transverse sectional view taken as indicated by line 5—5 in FIG. 3.
Figure 6:
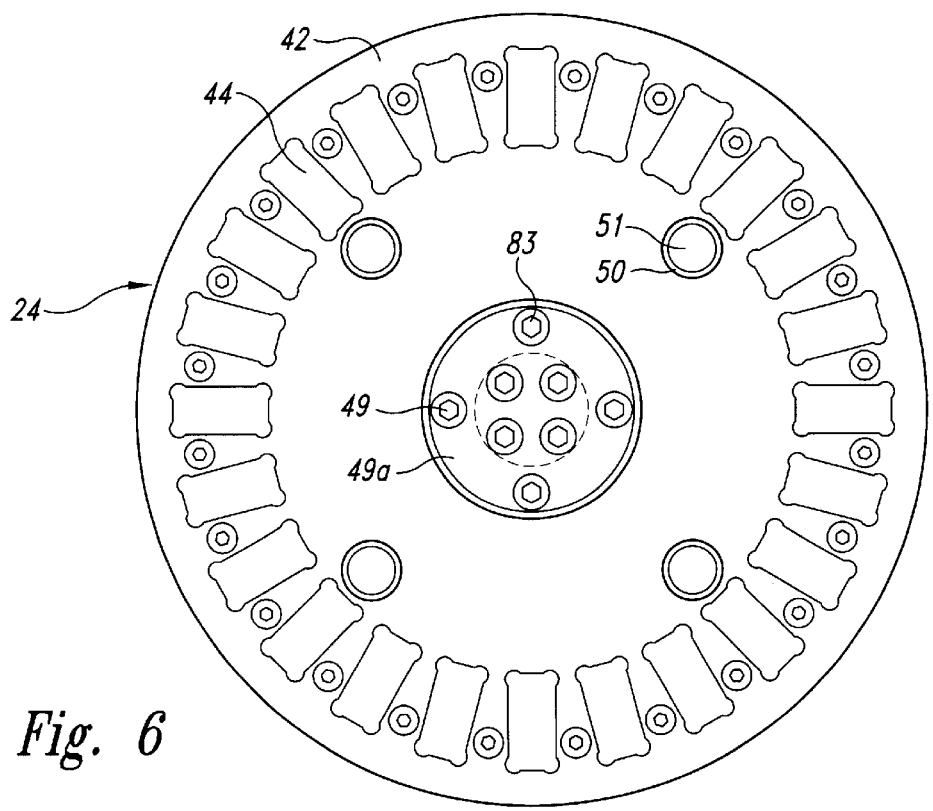
FIG. 6 is an end view of the left hand magnet rotor as viewed looking to the right in FIG. 1.

Referring to FIG. 5, the fifth rotor 52 can be generally square-shaped in elevation providing four outer edge faces 52a, each of which has a central ear 53 projecting radially therefrom. These ears 53 are formed with threaded radial bores extending toward the stub shaft 20 from their outer ends to receive bolts 54 on which bushings 55 are sleeved. The bushings 55 fit into center openings in center hub portions 56c of a pair of diametrically opposite swing units 56. Each swing unit has a pair of swing arms 56a–56b with cam slots 57 formed adjacent their outer ends. These cam slots each receive a cam follower roller 58 to track therein. Each roller 58 is mounted on a respective stud 59 which is secured in a respective block 60 projecting toward the fifth rotor 52 from the mounting disc 42 of the respective magnet rotor. The blocks 60 may be mounted on the discs 42 by a pair of cap screws 60a. When the magnet rotors are retracted the maximum axial distance from the conductor rotors 26–27 as shown in FIGS. 1 and 2, a respective pair of the blocks 60 extends on opposite sides of each of the ears 53 of the fifth rotor 52 so that the swing units 56 will then be coplanar with the fifth rotor 52 as shown in FIG. 3. This compact arrangement assists in minimizing the axial length of the coupler. It is apparent that alternatively the rollers 58 can be mounted on the swing units 56 and the cam slots 57 can be formed in the blocks 60.

With the described slotted rocker arm and follower roller arrangement it is apparent that when the magnet rotors 24–25 move axially away from the conductor rotors 26–27 and increase the width of the air gaps 48–48', the swing units 56 will responsively pivot on the center bolts 54 so that their ends will swing toward the fifth rotor 52. During this swinging movement the rollers 58 track in the slots 57 toward their inner end and as a result each magnet rotor moves equally toward the fifth rotor 52, thereby increasing the width of the air gaps 48–48' to the same extent. The swing units 56 are preferably sized so that when they are in their fully extended position (FIG. 2) the air gaps are of the desired minimum width.

It is preferred that a set of springs 60 be mounted radially outward of the air gap equalizing mechanism on pins 62 projecting from the magnet rotors 24–25. The springs may be compression springs supplementing the bias of the magnets operating in conjunction with the ferrous backing members 32–33 to urge the magnet rotors 24–25 apart to thereby narrow the air gaps 48–48'. Thus, the compression springs function to speed up renewal of the coupler after experiencing overload. Similarly the springs 60 may be tension springs to slow the recovery time following overload.

It will be appreciated that the springs 60 also effect the start of an overload condition by either resisting (compression springs) or assisting (tension springs) the magnetic forces axially biasing the magnet rotors 24–25 away from the conductor rotors 26–27 when the coupler nears an overloaded condition.

Figure 4:
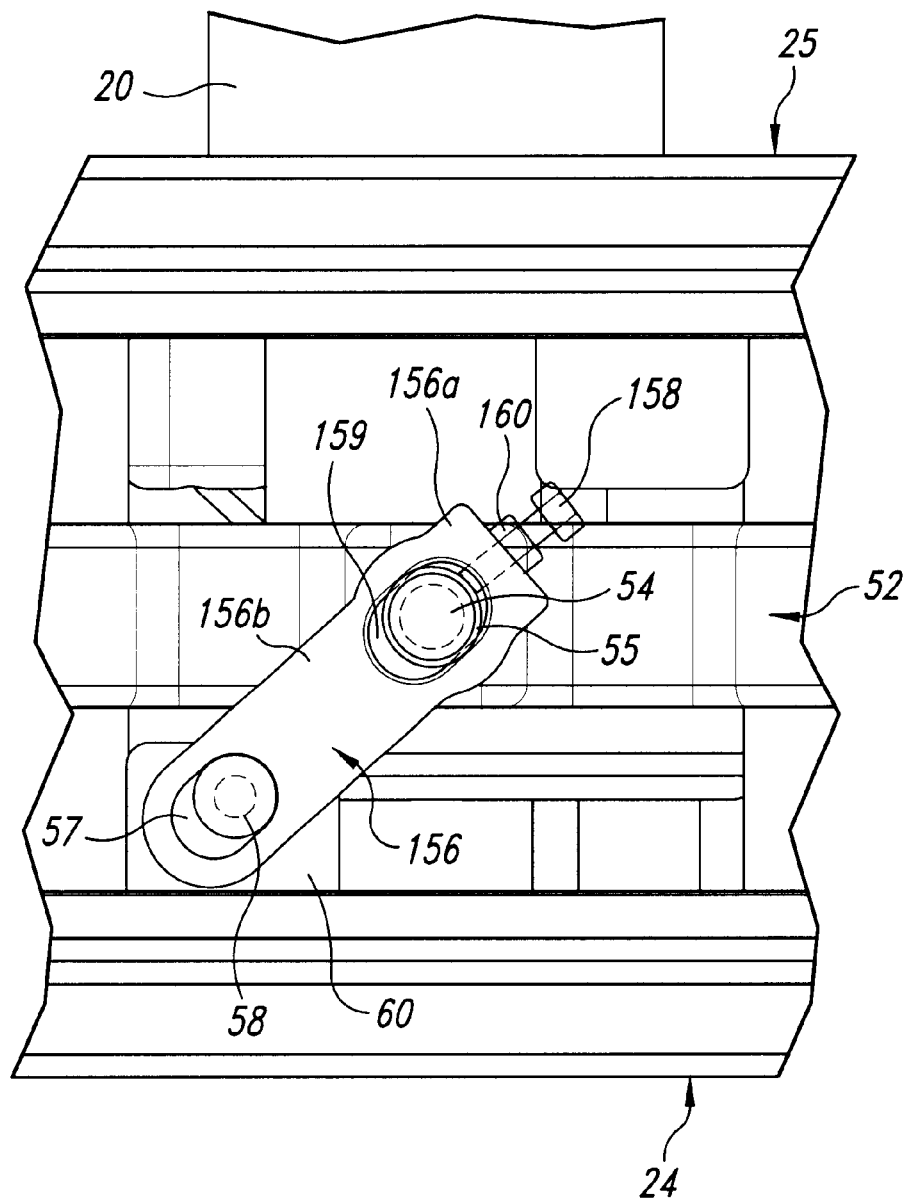
FIG. 4 is a detail fragmentary view taken like FIG. 2, but with the magnet rotors advanced a quarter turn.

Referring to FIG. 4, it is seen that alternate of the swing units are modified to provide adjustment of the minimum width for the air gaps 48–48'. The modified swing units 156 have only one operating arm 156b cooperating with a magnet rotor. The other arm 156a is shortened and has an adjustment screw 158 threaded into an end hole intersecting an elongated center opening 159 in the swing unit 156. This opening (slot) 159 has a width corresponding to the diameter of the bushings 55. As a result the swing unit 156 is slide mounted lengthwise on the bushing 55 and bolt 54 for adjustment by the screw 158 which limits the effective length of the center slot 159 by the extent of the projection of the screw 158 into the slot. As the adjustment screw 158 is advanced into the slot 159 the minimum width of air gaps 48–48' is responsively increased. The screw 158 is preferably provided with a lock nut 160 to bear against the outer end of the swing arm 156a when the desired swing minimum air gap adjustment has been made. In the illustrated example, the pair of adjustable swing units 156 are slidably interconnected with one of the magnet rotors 24–25 and are located between two of the full-length swing units 56. For balancing, preferably there are a minimum of two full-length swing units 56 alternating with two adjustable swing units each controlling the minimum width of one of the air gaps 48–48'.

From the foregoing description it will be appreciated that only one of the air gaps 48–48' need be provided with adjustment of its minimum because the linkages 56 cause both air gaps 48–48' to remain equal. In other words an adjustable stop controlling the minimum of one of the air gaps results in a like minimum setting of the other air gap. The adjustable stop may take a different form than that illustrated. For example, one or more of the pins 51 may be extended and threaded at one end to receive an adjustment nut which limits outer travel of the adjacent magnet rotor and thereby adjusts the minimum of the air gap between this magnet rotor and the respective conductor. Similarly, the stub shaft 20 may be provided with a central cylindrical threaded section on which a spanner nut is threaded which extends radially to be engaged by the outer face of magnet rotor 23. Adjustment of the spanner nut determines the extent of outer travel of the rotor 23 and thereby stets the minimum for the air gap 48'.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A coupler comprising:
   a shaft having a rotary axis;

a central rotor mounted on said shaft;

pins projecting from said central rotor in opposite directions parallel to said rotary axis;

a pair of outer rotors slidably mounted on said pins;

swing arms centrally swing-mounted on said central rotor and each pivotally and slidably connected adjacent its ends to said outer rotors for swinging movement in a swing range having an outer limit at which said outer rotors are spaced an equal distance axially from said central rotor and having an inner limit at which said outer rotors are adjacent said central rotor; and adjustment means extending between said central rotor and one of said outer rotors for adjusting said outer limit.

2. A coupler according to claim 1 in which said outer rotors each include a permanent magnet backed with a ferrous member.

3. A coupler comprising:

a shaft having a rotary axis;

a central rotor mounted to said shaft;

pins projecting from said central rotor in opposite directions parallel to said rotary axis;

a pair of outer rotors slidably mounted on said pins;

swing arms centrally swing-mounted on said central rotor and each pivotally and slidably connected adjacent its ends to said outer rotors such that said outer rotors are limited to moving axially in opposite directions on said pins between outer and inner limits of axial travel;

a link extending between pivotal connections with said central rotor and one of said outer rotors, the pivotal connection with said central rotor comprising a roller mounted on said central rotor and riding in a longitudinal slot in said link; and an adjustment screw on said link moveable along said slot for adjusting the extent of travel that said roller can travel along said slot and thereby adjusting said outer limit of axial travel of said outer rotors.

4. A coupler according to claim 3 in which said outer rotors each contain permanent magnets backed by a ferrous member, and in which a second shaft is mounted in coaxial relationship with said rotary axis and has two conductor rotors mounted as a unit thereon, said conductor rotors each having an electroconductive element spaced by an air gap from a respective one of said outer rotors, said air gaps having a minimum width established by adjustment of said adjustment screw.

5. A coupler comprising:

two coaxial rotors which are axially moveable relative to one another along a rotary axis;

a central member midway between said rotors and arranged to rotate in unison therewith;

swing arms centrally swing-mounted on said central member and each pivotally and slidably connected adjacent its ends to said outer rotors for controlling the range of axial movement of said outer rotors between inner and outer limits and for causing axial movement of said outer rotors to be equal and in opposite directions; and an adjustment mechanism extending between said central member and one of said outer rotors for adjusting said outer limit.

6. A coupler according to claim 5 in which said adjustment mechanism comprises a link pivotally and slidably connected at an outer end to said one of said outer rotors in the manner that said swing arms are pivotally and slidably connected to said outer rotors, said link being pivotally and slidably connected at an inner end to said central member by an adjustable connection whereby the effective length of said link can be adjusted to adjust said outer limit.

7. A coupler according to claim 6 in which said adjustable connection comprises a longitudinal slot in said link with inner and outer ends, an adjustment screw threaded into said link and having one end moveable into said slot through said outer ends and a pivot unit extending from said central member into said slot and arranged to be engaged by said adjustment screw to limit the effective length of said slot and thereby limit the length of said link.

8. A coupler comprising:

a rotary member having a rotary axis and pins projecting therefrom in parallel spaced relation to said rotary axis;

a rotor slide-mounted on said pins between inner and outer limits;

a link having an outer end pivotally connected to said rotor, and having an inner end with a pivotal connection to said rotary member;

said pivotal connection comprising a longitudinal slot in said link with inner and outer ends, an adjustment screw threaded into said link and having one end moveable into said slot through said outer end, and a pivot unit extending from said central member into said slot and arranged to move relative to the length of said slot responsive to axial movement of said rotor on said pins, and to be engaged by said adjustment screw to limit the effective length of said link, thereby providing adjustment for said outer limit.

9. A coupler according to claim 8 in which said pivot unit comprises a pin projecting from said central member into said slot, and a bearing sleeved on said pin and arranged to be engaged by said adjustment screw.

10. A coupler, comprising:

first and second rotary shafts having a rotary axis;

two coaxial magnet rotors each containing a respective set of permanent magnets;

two coaxial conductor rotors each having a non-ferrous electroconductive ring spaced by an air gap from a respective one of said sets of magnets;

a first two of said rotors being spaced apart a fixed axial distance and being mounted as a unit on said first shaft to rotate in unison therewith;

the remaining two of said rotors being mounted to rotate in unison with said second shaft and to be moveable axially in opposite directions with respect to said second shaft into and out of coupled relationship with said first two of said rotors;

magnet attracting material associated with said conductor rotors such as to interact with respective of said sets of permanent magnets and magnetically bias said rotors into a said coupled relationship; and an adjustable stop associated with said rotors and limiting axial movement between said magnet rotors and said conductor rotors to a travel range between a minimum and a maximum said air gap, said minimum air gap being adjustable by adjustment of said stop so as to be such that a slip between said shafts from an overload condition causes axial thrust exceeding said bias, thereby disengaging said coupler.

11. A coupler according to claim 10 in which said adjustable stop is arranged to occupy a position between one of said first two of said rotors and an adjacent one of said remaining two of said rotors so as to determine said minimum air gap, and in which a linkage is arranged so that said remaining two of said rotors move axially in unison in opposite directions with respect to one another.

12. A coupler according to claim 11 in which said remaining two of said rotors are said magnet rotors.

13. A coupler according to claim 11 in which an additional rotor is mounted on said second shaft, and is located between said remaining two of said rotors, and in which said linkage is centrally swing-mounted on said additional rotor.

\* \* \* \* \*